March 19, 1968   F. J. SCHMITZ   3,373,669
SPREADERS
Filed Sept. 1, 1965   3 Sheets-Sheet 1
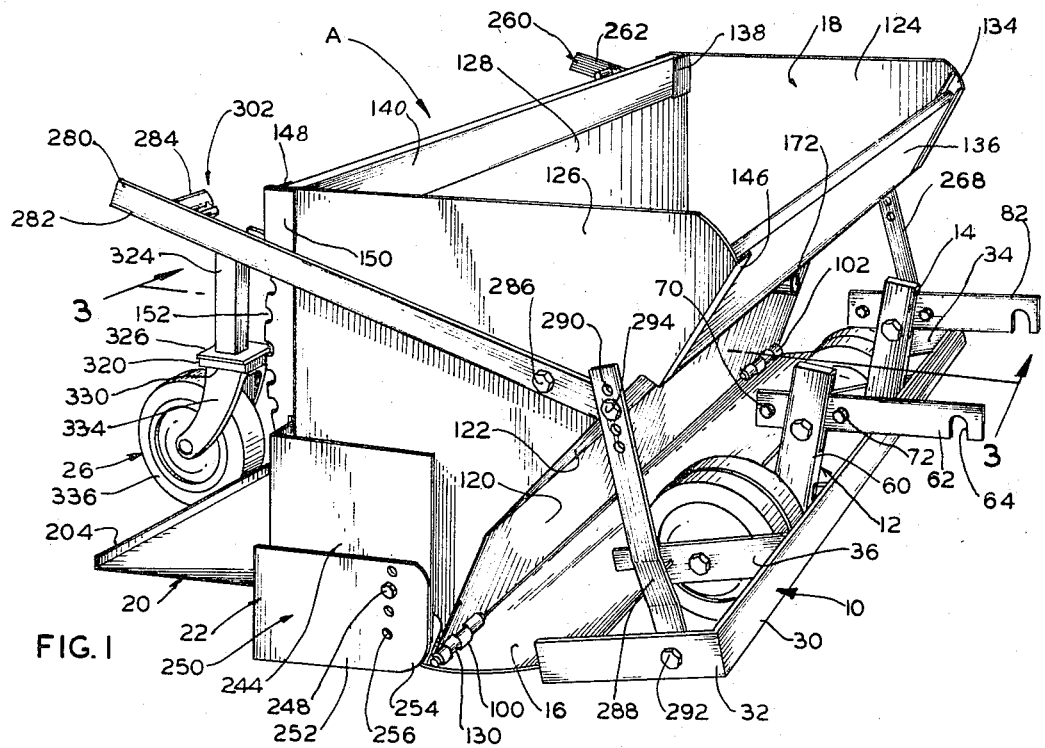
FIG. 1
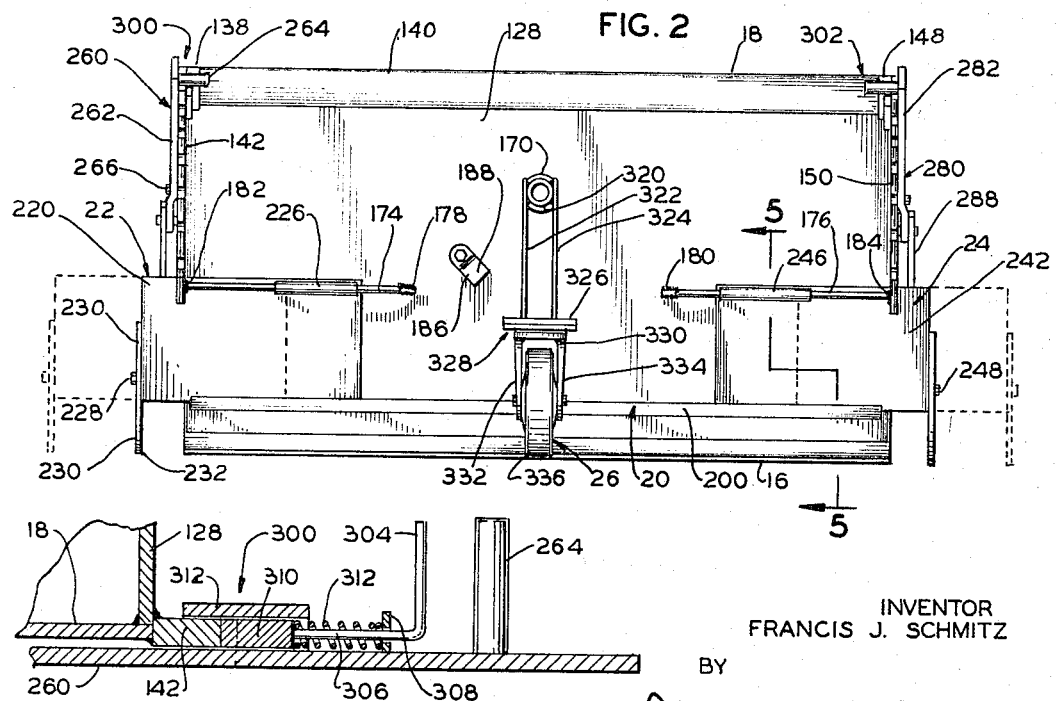
FIG. 2
FIG. 6
INVENTOR
FRANCIS J. SCHMITZ
BY
Joseph Alan Fenlon, Jr.
ATTORNEY March 19, 1968     F. J. SCHMITZ     3,373,669
SPREADERS Filed Sept. 1, 1965     3 Sheets-Sheet 2

INVENTOR
FRANCIS J. SCHMITZ

BY Joseph Alan Fenlon Jr.

ATTORNEY

March 19, 1968  F. J. SCHMITZ  3,373,669
SPREADERS

Filed Sept. 1, 1965  3 Sheets-Sheet 3

INVENTOR
FRANCIS J. SCHMITZ
BY
Joseph Alan Fenlon Jr.
ATTORNEY 3,373,669
SPREADERS
Francis J. Schmitz, St. Louis County, Mo.
(8905 Russell, Brentwood, Mo. 63117)
Filed Sept. 1, 1965, Ser. No. 484,170
5 Claims. (Cl. 94—44)

ABSTRACT OF THE DISCLOSURE

The invention disclosed herein provides a portable spreader suitable for attachment to the rear portion of a dump truck, adapted to receive the contents of the dump truck and apply the same to preselected surfaces a predetermined widths and predetermined depths, notwithstanding irregularities in the surface to be covered. The disclosure also provides a spreader which is portable about the job site and may be easily moved by one man and which may be towed behind a vehicle without damaging the surfaces over which it is towed, if so desired.

---

This invention relates to construction and paving equipment.

It is the object of this invention to provide a portable spreader which may be attached to the rear of a dump truck and moved freely about.

It is also an object of this invention to provide a spreader of the class described which is adjustable in width and depth for the spread to be made.

It is a further object of the present invention to provide a spreader of the class described with self-contained means for freely moving the spreader about.

With the above and other objects in mind, which shall become immediately apparent upon reading the specification, my invention resides in the unique and novel form, construction, arrangement and combination of the various elements herein described in the specification, shown in the drawings and claimed in the claims.

In the drawings:

FIGURE 1 is a perspective view taken from the right front side of my invention;

FIGURE 2 is a rear elevational view thereof;

FIGURE 6 is an enlarged fragmentary sectional view taken along lines 6—6 of FIGURE 3;

Figure 7:
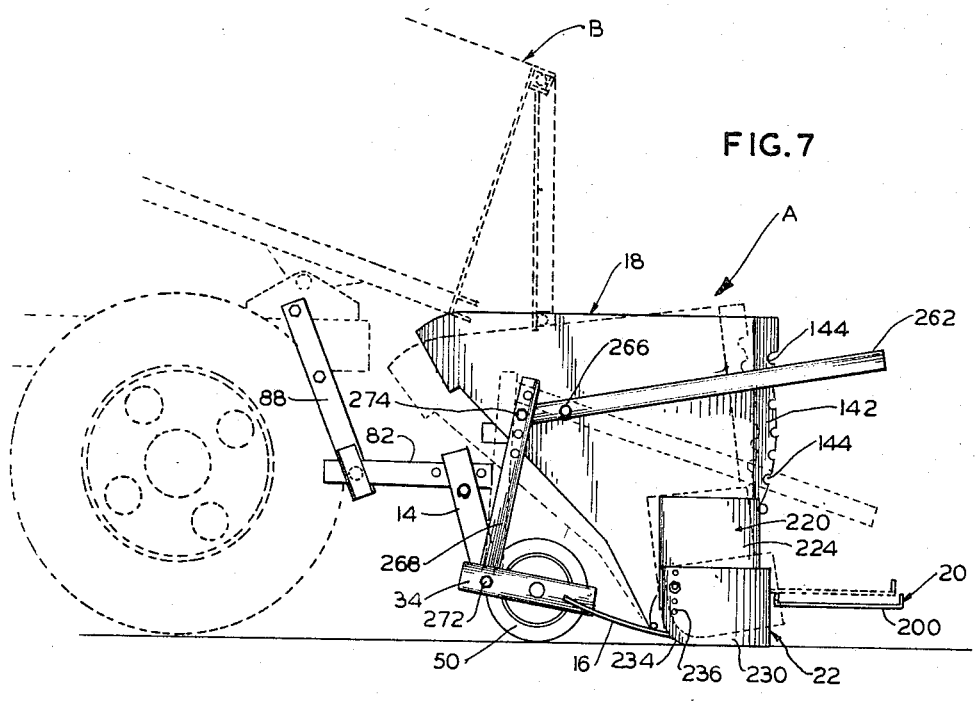
FIGURE 7 is a left side elevational view of my invention in use behind a dump truck.

Referring now in more detail and by reference character to the drawings, which illustrate a preferred embodiment of my invention, A designates a gravel spreader comprising a base 10, a pair of attachment brackets 12, 14 secured to the base 10, an arcuate blade 16 secured to the base 10, a hamper 18 pivotally attached to the blade 16 and the base 10, a platform 20 pivotally secured to the hamper 18, and a pair of wings 22, 24, slidably secured to the hamper 18 on opposing sides thereof for outward and inward lateral movement with respect thereto. It should be apparent from FIGURES 3 and 7 that the center of gravity of the hamper 18 lies between the attachment point to the blade 16 and the base 10. A detachable wheel 26 is also provided for purposes presently more fully to appear.

The base 10 includes a forward transverse member 30, outer lateral members 32, 34, and two pairs of spaced parallel axle support members 36, 38 and 40, 42, respectively, which respectively support axles 44, 46, on which are mounted rollers 48, 50.

The attachment bracket 12, includes an upwardly projecting U-shaped link member 60 which is rigidly attached at one end to the axle support member 38, and which is pivotally attached at the other end to a forward extending link member 62. The link member 62 includes at one end a downwardly presented U-shaped notch 64, adapted to receive the horizontal connecting bar 86 on a bracket 88 secured to a truck B. At the other end the link member 62 includes a pair of spaced stop bolts 70, 72, disposed on opposing sides of the link member 60 for limiting movement of the link members 60, 62, with respect to each other.

The attachment bracket 14 is identical to the bracket 12 and includes an upwardly projecting link member 80 which is rigidly attached at one end to the axle support member 40, and which is pivotally attached at the other end to a forwardly extending link member 82. The link member 82 includes at one end a downwardly presented U-shaped notch 84 adapted to receive the horizontal connecting bar 86 on a bracket 88 secured to the truck B. Also similarly, the link member 82 at its other end includes a pair of stop bolts 90, 92, adapted to limit movement of the link members 80, 82, with respect to each other.

Figure 3:
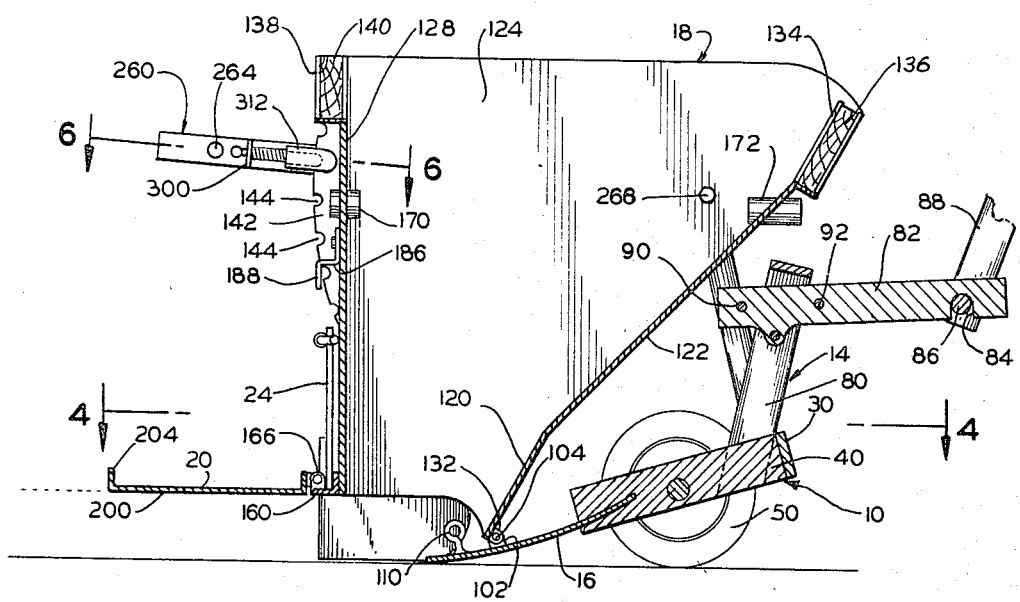
FIGURE 3 is a sectional view taken along lines 3—3 of FIGURE 1.
Figure 4:
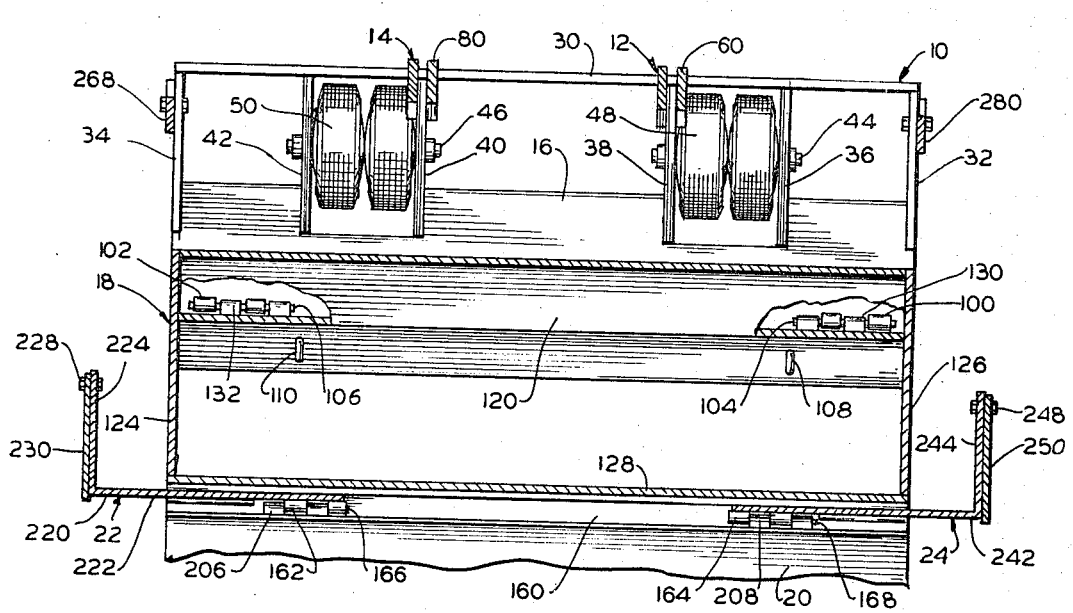
FIGURE 4 is a sectional view taken along lines 4—4 of FIGURE 3.
Figure 5:
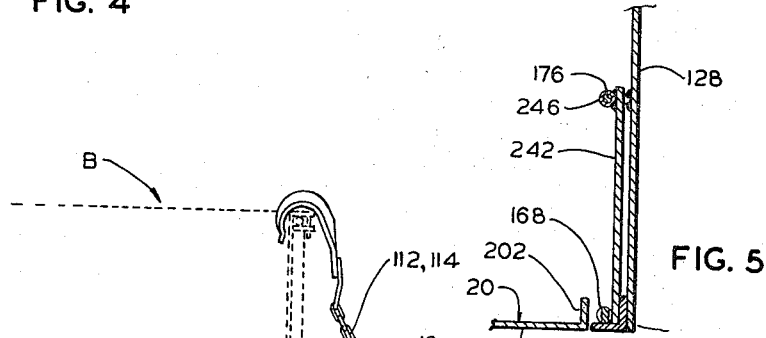
FIGURE 5 is an enlarged fragmentary sectional view taken along lines 5—5 of FIGURE 2.

The arcuate blade 16 is welded or otherwise rigidly secured to the rear portions of the members 32, 34, 36, 38, 40 and 42, and extends downwardly and rearwardly therefrom as best seen in FIGURES 1 and 3. On each opposing lateral side intermediate the forward margin and the rear margin, the blade 16 is provided with a pair of axially aligned hinge brackets 100 and 102, respectively, each respectively adapted to receive a hinge pin 104, 106. Welded or otherwise rigidly secured to the rear portion of the blade 16 is a pair of eyelets 108, 110, each respectively provided with secured chains 112, 114. It should be here noted that the blade 16 has a substantial transverse dimension for purposes presently more fully to appear.

The hamper 18 is sized to be substantially the same width as the blade 16 and includes a forward base panel 120, a forward middle panel 122, left and right side panels 124, 126, and a rear panel 128, all rigidly secured one to the other at their common margins. Provided along the lower margin of the base panel 120 in alignment with the hinge brackets 100, 102, are complimentary hinge brackets 130, 132, respectively, also adapted to receive the hinge pins 104, 106, respectively, and provide a pivotal joint between the blade 16 and the hamper 18, all for purposes presently more fully to appear. The panels 120 and 122 are angularly disposed with respect to each other to provide clearance between the base 10 and the hamper 18 when the hamper 18 is pivoted fully forward with respect to the base 10, as can best be seen in FIGURE 8.

The left side panel 124 includes a forward channel 134 adapted to receive one end of a forwardly presented abuse boards 136, also includes a rear channel 138 adapted to receive one end of a rearwardly presented abuse board 140, and further includes along its rear margin an elongated element 142 having a plurality of spaced notches 144, all for purposes presently more fully to appear.

Similarly, the right side panel 126 includes a forward channel 146 adapted to receive the other end of the abuse board 136, a rear channel 148 adapted to receive the other end of the abuse board 140, and an elongated element 150 having a plurality of spaced notches 152, also for purposes presently more fully to appear.

It should be here noted that the abuse boards 136, 140, are freely slidable in their respective channels and may be slidably removed from the tops of their respective channels when replacement is required.

The rear panel 128 is a substantially flat panel which is provided along its lower margin with an elongated surface 160, on the top of which are mounted spaced but axially aligned hinge brackets 162, 164, respectively, adapted to receive hinge pins 166, 168. Centrally located on the panel 128 is a cylindrical sleeve 170 which is in axial alignment with a second cylindrical sleeve 172 on the forward middle panel 122, for purposes presently more fully to appear. Mounted on opposing sides of the rear panel 128 are axially aligned horizontal rods 174, 176, each respectively having an inner end 178, 180, which is bent forwardly and welded or otherwise rigidly secured to the rear panel 128, and each also respectively having an outer end 182, 184, which is welded or otherwise rigidly secured to the elements 142, 150, respectively, in such manner that the rods are spaced and parallel to the plane of rear panel 128, as well as being horizontal, all for purposes presently more fully to appear. Bolted to the central part of the rear panel 128 is a bracket 186, having a flat element 188 which is spaced from and parallel to the panel 128 for purposes presently more fully to appear.

The platform 20 comprises large downwardly presented flat face 200, an upwardly extending forward lip 202, and an upwardly extending rearward lip 204. Mounted on the forward lip 202 and extending forwardly therefrom are hinge brackets 206, 208, which are complementary to the hinge brackets 162, 164, respectively, and which coact to attach the platform 20 pivotally to the hamper 18.

The wing 22 comprises a large L-shaped element 220 having a rear segment 222 and a lateral segment 224. Secured to the upper portion of the rear segment 222 in encircling disposition about the rod 174 is an elongated cylindrical sleeve 226. It should here be noted that the lower margin of the segment 222 is snugly disposed between the panel 128 and the hinge bracket 162, which serves as a sliding guide. The lateral segment 224 is provided with a threaded bore (not shown) in which is mounted a bolt 228. Attached to the lateral segment 224 by the bolt 228 is an edging plate 230 having a flat horizontal edge 232, a forwardly presented curved edge 234, and a plurality of vertically spaced bores 236, sized for acceptance of the bolts 228.

Similarly, the wing 24 comprises a large L-shaped element 240 having a rear segment 242 and a lateral segment 244; the upper portion of the rear segment 242 is provided with an elongated cylindrical sleeve 246 through which is slidably inserted the rod 176; the lower portion of the rear segment 242 is guidably confined between the panel 128 and the hinge bracket 164; and the lateral segment 244 is provided with a threaded bore (not shown) in which is mounted a bolt 248. Similarly attached to the lateral segment 244 by the bolt 248 is an edging plate 250 having a flat horizontal edge 252, a forwardly presented curved edge 254 and a plurality of vertically spaced bores 256, all sized for acceptance of the bolt 248.

The position of the hamper 18 with respect to the base 10 is controlled by lever controls 260, 280, respectively located on opposing sides of the hamper 18. The lever control 260 includes an upper lever arm 262, which has an inwardly extending hand support 264, and which is pivotally attached to the side panel 124 by bolt 266 and a lower lever arm 268 which includes a plurality of spaced bores 270 and is pivotally attached to the base 10 by bolt 272. The arms 262, 268 are pivotally connected to each other by a third bolt 274, which extends through one of the bores 270. Similarly, the lever control 280 includes an upper lever arm 282 having a hand support 284, and being pivotally attached to the side panel 126 by a bolt 286, and a lower lever arm 288 which includes a plurality of spaced bores 290 and is pivotally attached to the base 10 by bolt 292. The arms 282, 288 are pivotally connected to each other by a third bolt 294, which extends through one of the bores 290.

Each of the lever controls 260, 280 is respectively provided with a locking control 300, 302, which is best seen in FIGURE 6 and which is mounted on each of the lever arms 262, 282 adjacent the hand supports 264, 284. For purposes of reducing the complexity of this application, only the locking control 300 is explained herein, and it should be understood that the construction of the control 302 is identical, but on the opposing lever arm 282. The locking control 300 comprises a release handle 304 and an elongated shaft 306 which extends through a guide plate 308 secured to the arm 262. The shaft 306 terminates in a selector pin 310 and a spring 312 biases the selector pin 310 away from the plate 308. Movement of the pin 310 is regulated by a retaining plate 312 which, like the guide plate 308, is secured to the arm 262. The control 300 is located on the arm 262 at a point where the selector pin will normally be biased into one of the notches 144 whereby the position of the lever arm 262 with respect to the hamper 18 is secured and in like manner the right side of the hamper 18 with respect to the base 10 is also secured.

Although it is not shown, it should be understood that the control 302 similarly locks a retaining pin in one of the notches 152 to secure the left side of the hamper 18 with repsect to the base 10.

Since the blade 16 is rigidly secured to the base 10 and the center of gravity of the hamper 18 is located between the edge of the blade 16 in contact with the supporting surface and the rollers 48, 50, the position of the base 10 and the blade 16 will remain fixed during all phases of operation, including adjustment of the lever controls 260, 280, and notwithstanding irregularities in the supporting surface. As can be best seen in FIGURE 3, it should be obvious that the rearward edge of the blade 16 will remain in constant contact with the supporting surface during operation, particularly when one considers the size of the force that would be required to cause the base 10 and the blade 16 to rotate clockwise in FIGURE 3 about the axle 46 of the roller 50.

Referring to FIGURE 7, it can be seen that the adjustment of the levers 260, 280 causes the hamper 18 to pivot with respect to the base 10 and the blade 16, while the base 10 and blade 16 remain in fixed position on the supporting surface.

It should be noted here that the surfacing member 160 is spaced above the ground and that the hamper 18 is open at the bottom. It should be further noted that the wings 22, 24 provide lateral sides for the opening at the bottom and the blade 16 provides the forward margin of the opening. As the hamper 18 is moved with respect to the blade 16, the surfacing member 160 is raised and lowered in elevation and the depth of the rearwardly presented opening may be selectively altered.

In use the locking controls 300, 302 are set in the notches 144, 152 of the elements 142, 150, respectively, whereby the surfacing member 160 is set at a predetermined level above the ground. Thereupon, the wings 22, 24 are adjusted outwardly to the required width of the spread to be made. The plates 230, 250 are then vertically adjusted on the lateral segments 224, 244 to where the edges 232, 252 are flat on the ground using the plurality of bores 236, 256 in the respective plates 230, 250. The platform 20 is then pivoted downwardly about the hinge pins 166, 168 to the horizontal position behind the surfacing member 160.

Thereafter, the spreader A is attached to the dump truck B with the forward abuse board 136 slightly forward of and below the tailgate of the dump truck B, as best seen in FIGURE 7. The vertical position of the abuse board with respect to the tailgate T of the truck B may be adjusted by varying the attachment point of the lower lever arm 268 to the upper lever arm 262 using the various bores 270 and by varying the attachment point of the lower lever arm 288 to the upper lever arm 282 using the various bores 280.

When the spreader A is properly attached to the truck B with the attachment brackets 12, 14 coupled to the brackets 68, 88, and the surfacing member 160 at the desired elevation, and the wings 22, 24 at the proper space, the materials in the bed of the dump truck may be gradually transferred into the hamper 18 by dumping in the conventional manner; and as the spreader A is pulled forwardly by the truck B, the materials in the hamper 18 will be spread evenly between the wings 22, 24 at a level determined by the surfacing member 160. The platform 20 may be used to support a man who keeps the material in the hamper 18 evenly distributed, and in addition smooths the surface created by the surfacing member 160. The blade 16 keeps the surface level notwithstanding the occurrence of irregularities in the surface being covered as seen by the rollers 48, 50.

Figure 8:
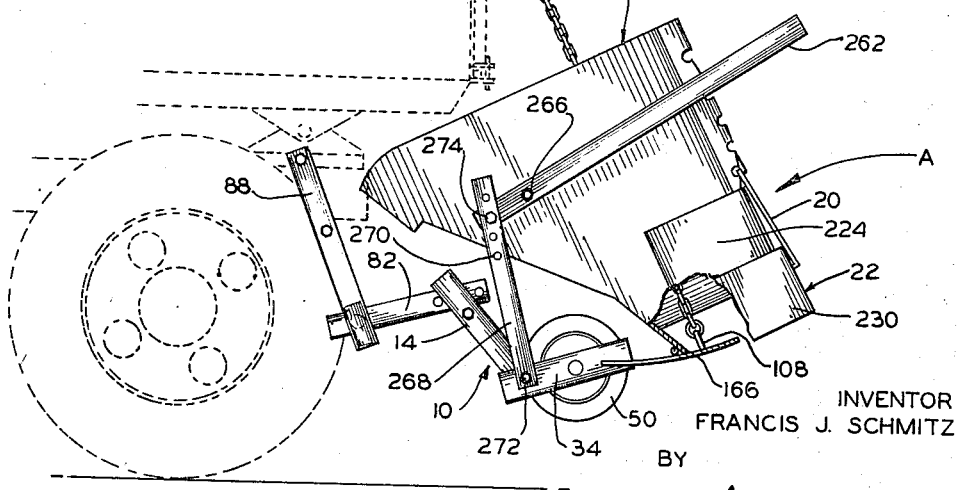
FIGURE 8 is a left side elevational view of my invention in the folded position being carried by the dump truck.

The spreader A may be transported from job site to job site in the manner best seen in FIGURE 8, wherein the spreader is depicted in the hauling position with the platform 20 folded against the rear panel 128, and held in place by the flat element 188 of the bracket 186, and the chains 112 and 114 passed through the open hamper 18 and secured to the truck B.

The detachable wheel 26 provides mobility around the various job sites by providing means for readily converting the spreader A to a wheeled device. The wheel 26 includes an elongated cylindrical mounting bar 320 which is sized for snug fitting disposition in the sleeves 170, 172 on the hamper 18, and which is terminated at its rear end with a pair of downwardly extending legs 322, 324, which in turn are attached to a flat wheel support plate 326. Rotatably attached to the bottom of the plate 326 is a wheel mount 328, including an upper annular plate 330, a pair of axle supports 332, 334, and a roller 336, rotatably attached to the supports 332, 334. The legs 322, 324 are sized sufficiently in length to place the spreader A entirely on the rollers 48, 50 and 336 when the wheel 26 is properly attached to the hamper 18, whereby the spreader A may be disconnected from the truck B and freely moved about by an individual workman.

The spreader A has been found to work satisfactorily with gravel and wet concrete, in the manner above described.

It should be understood that changes in the form, construction, arrangement and combination of the various parts of my invention may be made and substituted for those herein shown and described without departing from the nature and principle of my invention.

Having thus described my invention, what I desire to secure by Letters Patent is recited in the following claims.

I claim:

1. A gravel spreader comprising a base, roller means operatively attached to said base, means for attaching said base to a truck, an elongated blade secured to said base and extending transversely thereacross in an arcuate downward and rearward direction, a hamper pivotally mounted on said blade and adapted for folding substantial quantities of construction material, surfacing means fixed at the base of said hamper for defining a surface level for material which is passed through said hamper, the center of gravity of the hamper being located forwardly of the pivotal point of the hamper with respect to the blade and the surfacing means being pivotally movable with the hamper as its pivots with respect to the blade, and means for fixing the surfacing means at a predetermined level above the lowermost edge of the blade.

2. A gravel spreader comprising a base, roller means operatively attached to said base, means for attaching said base to a truck, an elongated blade secured to said base and extending transversely thereacross in an arcuate downward and rearward direction into supporting contact with the surface on which the spread is to be made, a hamper pivotally mounted on said blade and adapted for holding substantial quantities of construction material, said hamper including a front and rear panel and a pair of opposing side panels, said hamper extending forwardly over said base toward said truck and having its center of gravity located forwardly of the pivotal attachment point of the blade, a surfacer located at the bottom of the rear panel and adapted for movement with the hamper as the hamper is pivoted on said blade, a platform pivotally attached to said hamper immediately adjacent to and in horizontal alignment with said surfacer, edging means located on opposing sides of said hamper for selectively altering the width of the material spread as it passes through the hamper, said edging means including a pair of complementary forwardly extending wings adjustably mounted on a pair of arms which project laterally outwardly from the hamper and which are slectively positionable with respect thereto, and means for selectively securing the hamper and the surfacer at predetermined pivotal positions with respect to said blade.

3. The spreader of claim 2, wherein the edging means includes a pair of wings slidably mounted on the back panel on opposing sides thereof, and being slidable in lateral outwardly and inwardly directions.

4. The spreader of claim 2, wherein the edging means includes a pair of wings slidably mounted on the back panel on opposing sides thereof, and being slidable in lateral outwaradly and inwardly directions, and a pair of edging plates each removably secured to one of the said elements on the lateral outer margins thereof.

5. The device of claim 2, wherein the means for securing the hamper at predetermined pivotal positions includes a notched element secured to the hamper, a first lever arm pivotally secured to the hamper, a second lever arm pivotally attached to the base and to the first lever arms and releasable locking means for engaging the notches in the element in secured relation, said locking means being integrally included on the first lever arm.

References Cited

UNITED STATES PATENTS

| 1,581,784 | 4/1926 | Butler | 94—46 |
| 1,961,064 | 5/1934 | Miller | 94—44 |
| 2,258,205 | 10/1941 | Halvorson | 94—44 |
| 3,108,517 | 10/1963 | Fingland | 94—46 X |

JACOB L. NACKENOFF, *Primary Examiner.*